A. M. LEVERING.
SELF LUBRICATING BEARING FOR TROLLEY WHEELS.
APPLICATION FILED JUNE 15, 1909.
960,354.
Patented June 7, 1910.
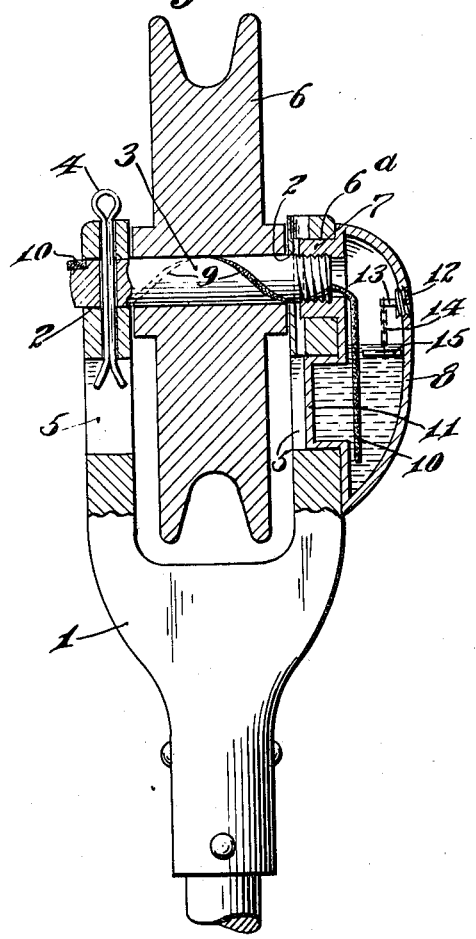
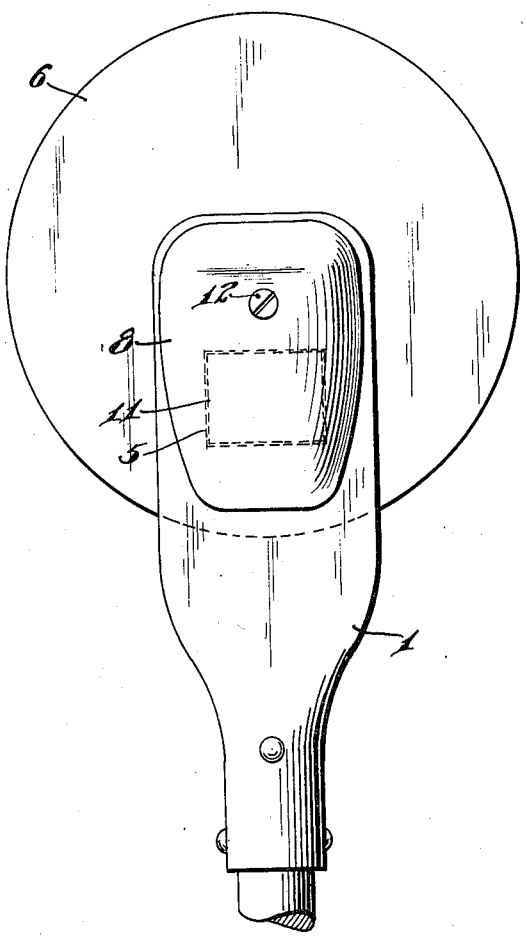
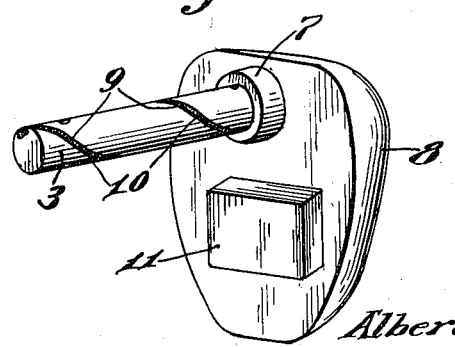
Witnesses
Inventor
Albert M. Levering,
By Joshua R. H. Potts.
Attorney

UNITED STATES PATENT OFFICE.

ALBERT M. LEVERING, OF PHILADELPHIA, PENNSYLVANIA.

SELF-LUBRICATING BEARING FOR TROLLEY-WHEELS.

960,354.  Specification of Letters Patent.  Patented June 7, 1910.

Application filed June 15, 1909. Serial No. 502,194.

*To all whom it may concern:*

Be it known that I, ALBERT M. LEVERING, a citizen of the United States, residing at Philadelphia, in the county of Philadelphia and State of Pennsylvania, have invented certain new and useful Improvements in Self-Lubricating Bearings for Trolley-Wheels, of which the following is a specification.

My invention relates to self-lubricating bearings for trolley wheels, the object of the invention being to provide an improved oil cup, adapted to be positioned and secured upon the ordinary trolley fork in use, and which will supply, by capillary attraction, through the medium of a wick, lubricant to the journal pin to maintain the wheel bearing and pin lubricated at all times.

A further object is to provide improvements of this character, which will occupy but small space, be so shaped as to prevent banging, and not catch and hold the fork against the trolley wire, should the trolley wheel jump the wire, and which can be manufactured and sold, and applied to the ordinary trolleys at a comparatively small cost.

With these and other objects in view, the invention consists in certain novel features of construction, and combinations and arrangements of parts as will be more fully hereinafter described and pointed out in the claims.

In the accompanying drawings, Figure 1, is a view partly in cross section illustrating my improvements. Fig. 2, is a view in side elevation, and Fig. 3, is a perspective view of the oil cup and journal pin detached.

1 represents the ordinary trolley wheel harp or fork, which is provided with alined openings 2, to receive the journal pin 3, held against escape by a cotter pin 4 passed through alined openings in a member of the harp, and into journal pin 3, and projecting into an opening 5 in the harp member, where the sections of the cotter pin are bent apart to hold it against removal. Ordinarily, two of these cotter pins are employed, one at each side, but with my improvements one is all that is necessary. The openings 5 in the trolley forks or harps are provided, for lightness, as well as economy's sake, and the trolley wheel 6 mounted upon journal pin 3, together with the structure above described, is the ordinary construction in use, and my improvements, which will now be explained, can be attached with only one change necessary, namely, counterboring one member of the harp as shown at 6ª, to receive an internally screw threaded nipple 7 on my improved oil cup 8, and screw threading the end of the journal pin 3, to engage the threads of the nipple 7, and providing the journal pin with a spiral groove 9 to receive a cord or wick 10, positioned in said groove. The wick 10 which is positioned in the spiral groove 9 of the journal pin 3, extends into the cup 8, and down below the lubricant level in the latter, so as to supply, by capillary attraction, the lubricant to the journal pin and trolley wheel, and maintain the latter uniformly lubricated at all times.

The cup 8 in order to enlarge its capacity, and furthermore, to more effectually secure the same in position, is provided with an offset or pocket 11, positioned in and over the opening 5 in one of the harp members, which will of course, prevent any turning movement of the cup on the harp.

12 represents a screw plug normally closing an opening through which lubricant is supplied to the cup, and this screw plug 12 is provided with a lug 13 on its inner end, to which a chain 14 is connected, which carries at its free end, a cross bar 15 longer than the diameter of the opening in the cup, so that when the screw plug is withdrawn to fill the cup, this cross bar 15 will prevent the misplacement of the plug, and hold it in convenient position to be reinserted when the cup is filled.

The cup 8, while one face is made flat to fit smoothly against the harp 1, the outer face is curved in all directions, or rather inclined in all directions, so as to prevent any possibility of the cup striking or catching upon the trolley wire. In other words, the cup is so shaped that should it engage the trolley wire, either in attempting to replace the trolley wheel, or when the trolley wheel jumps the wire, it will shed, or rather throw off the wire, and prevent any injury by reason of the contact.

Various slight changes might be made in the general form and arrangement of parts described without departing from my invention, and hence I do not restrict myself to the precise details set forth, but consider myself at liberty to make such changes and alterations as fairly fall within the spirit and scope of the claims.

Having thus described my invention what

I claim as new and desire to secure by Letters Patent is:

1. In a device of the character described, the combination with a trolley harp, of an oil cup having a screw threaded nipple integral therewith, and adapted to be projected through an opening in the harp, a journal having a screw threaded end screwed into said nipple, devices securing said journal in the harp and holding the cup against the harp, a trolley wheel on said journal, said journal having a spiral groove, and a lubricant feeding wick located in said groove and projecting into the oil cup, substantially as described.

2. In a device of the character described, the combination with a harp, having an opening therein, a journal pin secured in said harp, having a groove therein, a wick in said groove, and a trolley wheel on said pin, of an oil cup removably secured to one end of said journal pin, an offset or pocket on said cup positioned in the opening in the harp, and said wick projecting into said cup.

3. In a device of the character described, the combination with a trolley harp, having journal pin receiving openings therein, and other openings below the journal pin openings, a journal pin in the journal pin openings, said pin and the members of said harp having registering openings, a cotter pin in one set of registering openings, one member of said harp having a counter-bored portion adjacent one of the journal pin openings, an oil cup, an internally screw threaded nipple integral with the oil cup and positioned in the counter-bored portion of the harp, screw threads on the journal pin engaging the threads in the nipple, said pin having a spiral groove therein, and a wick in said groove projecting into the cup.

4. In a device of the character described, the combination with a trolley harp, having journal pin receiving openings therein, and other openings below the journal pin openings, a journal pin in the journal pin openings, said pin and the members of said harp having registering openings, a cotter pin in one set of registering openings, one member of said harp having a counter-bored portion adjacent one of the journal pin openings, an oil cup, an internally screw threaded nipple positioned in the counter-bored portion of the harp, screw threads on the journal pin engaging the threads in the nipple, said pin having a spiral groove therein, and a wick in said groove projecting into the cup, an offset or pocket on the inner face of said cup, projecting into one of the openings in the harp below the journal pin openings.

In testimony whereof I have signed my name to this specification in the presence of two subscribing witnesses.

ALBERT M. LEVERING.

Witnesses:
R. H. KRENKEL,
J. A. L. MULHALL.